Dec. 4, 1956 C. M. SMITH 2,773,248

WIRING DEVICE

Filed May 5, 1954 2 Sheets-Sheet 1

WITNESSES:

E. A. McCloskey.

[signature]

INVENTOR

Clarence M. Smith.

BY

Arthur T. Stratton

ATTORNEY

Dec. 4, 1956 C. M. SMITH 2,773,248

WIRING DEVICE

Filed May 5, 1954 2 Sheets-Sheet 2

United States Patent Office 2,773,248

Patented Dec. 4, 1956

2,773,248

WIRING DEVICE

Clarence M. Smith, Trumbull, Conn., assignor to The Bryant Electric Company, Bridgeport, Conn., a corporation of Connecticut Application May 5, 1954, Serial No. 427,733

11 Claims. (Cl. 339—164)

My invention relates generally to electric wiring devices, and more particularly to a new and improved screwless terminal for electrically connecting such devices to a source of electrical power, and for electrically connecting such devices together.

Although in principle my invention is applicable to a wide variety of wiring devices, it is more particularly suited for the smaller low-voltage devices, such as household wiring devices, where the use of standard electrical connecting means, such as terminal screws, represent a substantial percentage of the cost of the complete wiring device. Such prior electrical connecting means have, in general, been independent of the electrical conducting means located inside the housing for the device and, consequently, have required both additional material and handling in order that all the component parts may be properly secured together and to the housing. In some cases such additional material and its handling costs have exceeded the value of the components. As can be appreciated, in fabricating prior devices machinery and dies have been required, whereby the assembly may be performed on a production basis which is an additional expense. Also, in such devices the use of standard terminal screws has necessitated forming the electrical conductors around the body of the terminal screws in order that a good electrical connection can be made between the electrical conductors and the electrical conducting components of the wiring device. Such a wiring procedure has entailed a considerable length of time and, as can be appreciated, the requisite labor cost of installation represents a substantial amount.

Accordingly, one object of my invention is to provide a new and improved wiring device of simplified construction.

Another object of my invention is to provide a new and improved wiring device having a minimum of component parts which may easily be assembled.

Another object of my invention is to provide a new and improved wiring device having improved means for making electrical connections thereto.

Another object of my invention is to provide a new and improved wiring device whereby electrical connections may be made thereto by merely inserting electrical conductors therein.

A further object of my invention is to provide a new and improved wiring device having integral means functioning both as a terminal and a conductor.

Still another object of my invention is to provide a new and improved wiring device which may rapidly be connected or disconnected to an electrical conductor.

A more specific object of my invention is to provide a new and improved wiring device having a single means located within the device which functions both to establish contact with an electrical conductor and to establish contact with an inserted connecter.

Another object of my invention is to provide a new and improved electrical receptacle having no external electrical components.

A still more specific object of my invention is to provide a new and improved electrical wiring device having jaw means located therein whereby electrical connections may be automatically made by the mere insertion of a wire, and which connections may be easily broken by moving a part of the jaw means by the insertion of a blunt instrument within the device.

These and other objects of my invention will become more apparent upon consideration of the following detailed description of a wiring device incorporating an electrical contact constructed in accordance with the principles of my invention when taken in connection with the attached drawings, in which.

Figure 1:
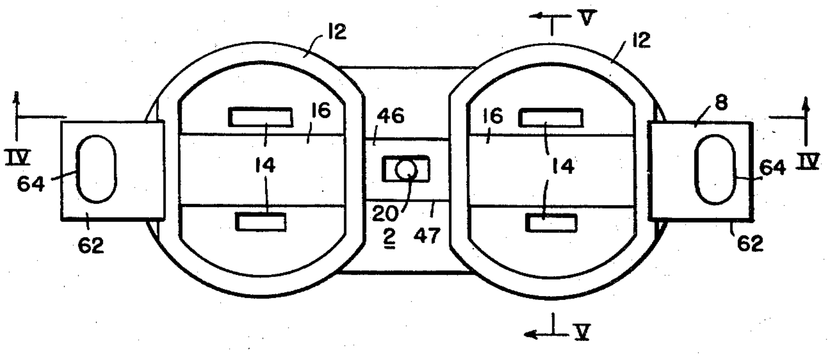
Figure 1 is a top plan view of a duplex receptacle constructed in accordance with the principles of my invention.

Although my invention is suitable for various types of wiring devices, for the purpose of illustrating my invention, the drawings and description disclose it as embodied in a duplex electrical receptacle having a pair of formed terminals located therein, and wherein the invention has certain novel features of cooperation. It is to be realized, however, that the terminals could be utilized in other types of wiring devices.

Basically my invention comprises a formed electrical terminal which is provided with integral means whereby the terminal may be electrically energized and which may be also provided with additional integral means whereby an inserted connector may be energized. Referring to the drawings, it will be noted that a receptacle constructed in accordance with the principles of my invention comprises an upper housing 2, a lower housing 4, a pair of electrical terminals 6, and a yoke 8 for securing the housings 2 and 4 together. The particular construction of housings 2 and 4 and the cooperable structure of yoke 8 whereby the housings 2 and 4 are secured together does not form a part of this invention but is more completely shown, described and claimed in my copending application filed concurrently herewith, Serial No. 427,734, entitled Wiring Device, which has been assigned to the same assignee as this invention.

Housings 2 and 4 are formed so that when they are assembled a pair of longitudinally extending spaced chambers 3 are provided adjacent each side of the longitudinal center line of the receptacle in each of which an electrical terminal 6 is located. Both the housings 2 and 4 are formed from any suitable insulating material, preferably of a molded insulating material which may readily be provided with the necessary internal guides and structure hereinafter described. Electrical terminals 6 are formed from any suitable electrical conducting material, such as copper or brass, which may readily be formed in a manner hereinafter described and which has a sufficient resiliency to operate in the manner as hereinafter described. Yoke 8 may be formed of any suitable material which has sufficient structural strength such as sheet metal. It should be noted that it is immaterial for the purposes of my invention as to the exact structure of the upper housing 2, lower housing 4 and yoke 8, so long as they are formed in order to receive and support a pair of terminals 6, and so as to permit electrical terminals 6 to function properly.

Referring to Figs. 1, 2, 4 and 5, it will be noted that the upper housing 8 is an irregularly formed member having a pair of irregularly formed downwardly extending laterally spaced sides 10 and a pair of upwardly offset, longitudinally spaced, approximately circular faces 12, in each of which are located a pair of spaced slots 14. Slots 14 are provided in order that the prongs of a male connector plug, not shown, may be inserted to engage the electrical terminal 6. In order to facilitate the insertion of such prongs, the outer faces 12 of the upper housing 2 are slightly dished inwardly and an integral divider projection 16 is provided on each face 12 between the slots 14. Divider 16 serves to provide additional insulation between the two slots 14 and to provide additional mechanical strength for the upper housing 2.

Referring to Figs. 2, 3, 4 and 5, lower housing 4 comprises an approximately rectangular base 28 which is provided with upwardly extending side walls 30 which, in turn, are joined together at each end of the base 28 by upwardly extending end walls 32. The upper edges of side walls 30 of lower housing 4 are adapted to engage the lower edges of side wall 10 of upper housing 2 when the receptacle is assembled. As more particularly described in the above-identified copending application, upper housing 2 and the lower housing 4 are each symmetrical with relation to both their longitudinal and lateral center lines, whereby the housings are definitely positioned relative to each other when assembled. The lower housing 4 is also provided with an integral upwardly extending hollow rectangular post 44 which is symmetrically located with reference to the longitudinal and lateral center lines of power housing 4, and which supports the central enlarged rectangular portion 46 of yoke 8. As shown in Fig. 1, the central portion 46 of yoke 8 is provided with any suitable securing means, such as a threaded opening 20 which is accessible through an opening 47 in upper housing 2 between faces 12, whereby a face plate, not shown, may be secured to the receptacle. Central portion 46 of the yoke is also provided at each end with integral downwardly extending arms which receive post 44 therebetween and which terminate in integral longitudinally extending arms 52 which are at approximately right angles to the downwardly extending arms. Each longitudinally extending arm 52 of yoke 8 is supported by the top surface 40 of the end wall 32 towards which it extends and is formed as to interlock with external projections on the ends of housings 2 and 4 so as to secure the housings 2 and 4 together when the longitudinally extending arms are deformed within the housings 2 and 4 to foreshorten them, as more particularly described in the above-identified application.

The yoke 8 terminates at each of its ends in an outwardly extending anchoring tab 62, whereby yoke 8 may be secured to any suitable support, not shown, by any suitable means (not shown). As shown, yoke 8 is provided with a hole 64 in each tab 62 for receiving a securing means. However, it is obvious that tab 62 may be provided with any of a variety of known formations for securing purposes.

Referring again to Fig. 5, it will be noted that lower housing 4 is provided with a spaced pair of upwardly extending walls 66 interiorly thereof which are displaced laterally on opposite sides of the longitudinal center line of lower housing 4, and which extend from opposite sides of a hollow rectangular post 44 to each end wall 32. Upper housing 2 is provided with a pair of spaced integral downwardly extending irregularly shaped members 70 which when assembled with the lower housing 4 engage the top surface of the walls 66 to form the longitudinally extending chambers 3 at each side of the longitudinal center line of the receptacle. As will be more particularly described hereinafter, a formed terminal 6 is securely located within each chamber 3.

As shown in Figs. 3, 4, 5, 6 and 7, terminals 6 are generally rectangular in form and are designed so that they may be fabricated from one piece of material by any suitable mechanical process such as by stamping. When so formed terminals 6 comprise a flat back 5 which, when assembled within the receptacle, is located against the adjacent inner surfaces 7 or 9 of sides 10 and 30, respectively, of each chamber 3. Each end of terminal 6, is formed into an arcuate blade 11 which extends inwardly of chamber 3 so that a blade 11 is located beneath each slot 14 at each end of the receptacle where it may be engaged by the prongs of an inserted connector plug. In order to facilitate making electrical contact between the prongs of an inserted connector and blades 11, a vertical slot 13 is provided adjacent each blade 11 which terminate above the bottom edge of terminals 6 whereby blade 11 may be flexed around a lower portion 17 of terminal 6 somewhat in the manner of a cantilever beam. If desired, in order to obtain a firmer engagement between the prongs of an inserted plug and blades 11, blades 11 may be provided with a circular projection 15 at the outermost extending point of blades 11 to engage the holes normally provided adjacent each end of the prongs of a plug. It should be noted that although blades 11 flex with relation to portion 17 of terminals 6, portion 17 is of sufficient width to prevent any fatigue failure of blades 11 at their bases. Further if desired, the parent metal from which terminals 6 are formed may be left to extend upwardly from blade 11, as at 22, if such is not needed for blade 11.

In order that wiring connections may easily be made to each terminal 6, the upper portion thereof between slots 13 is provided with an irregular longitudinally extending opening 19 having a series of stepped upper edges 21, 23 and 25 and a longitudinally extending lower edge 27 at each side of its vertical center line. It should be particularly noted that the wire diameters of the gauges of wire ordinarily used in wiring such devices are well known and, therefore, the requisite clearance between the upper and lower edges necessary for receiving such gauges may be determined. Thus, as shown, for use in ordinary 110 volt household wiring installations where wire size is determined primarily by Underwriter's requirements, the standard gauges 10, 12 and 14 would normally be used. It will be noted that upper jaws 21, 23 and 25 and lower jaws 27 are sloped to converge inwardly so that their inner opposed edges are spaced a fixed distance apart. In accordance with the wire requirements, the upper jaws are displaced from the lower jaw a distance slightly less than the outside diameter of the particular wire size that is to be received therebetween. Thus, for example, jaws 21 and 27 are so spaced so that the opening therebetween is slightly less than the outside diameter of the #14 wire.

Figure 2:
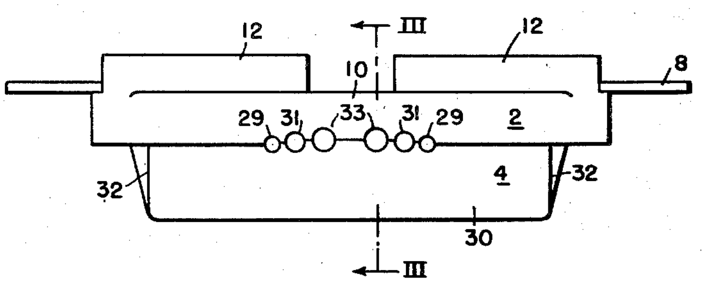
Fig. 2 is a side elevational view of the duplex receptacle shown in Fig. 1.
Figure 3:
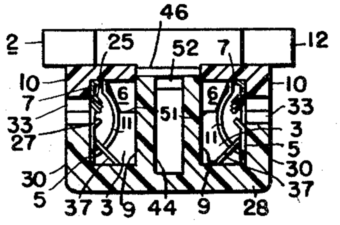
Fig. 3 is a cross-sectional view of the duplex receptacle shown in Fig. 2, taken substantially along the lines III—III thereof.
Figure 4:
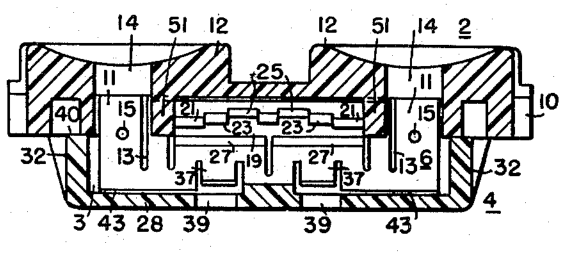
Fig. 4 is a longitudinal sectional view of the duplex receptacle shown in Fig. 1, taken substantially along the lines IV—IV thereof.
Figure 5:
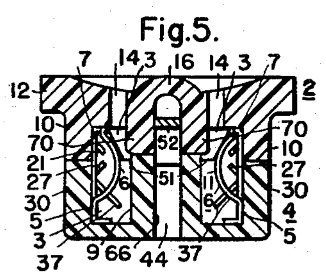
Fig. 5 is a cross-sectional view of the duplex receptacle shown in Fig. 1 taken substantially along the lines V—V thereof.
Figure 6:
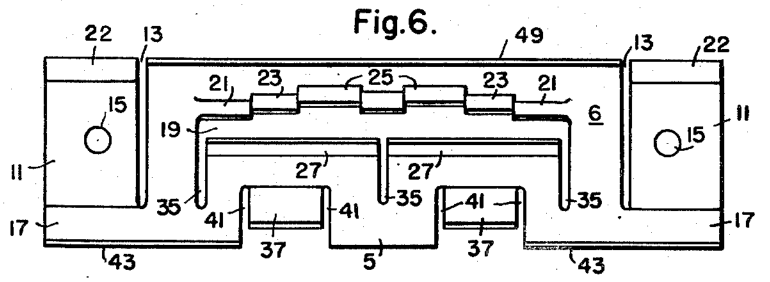
Fig. 6 is an enlarged side elevational view of an electrical terminal constructed in accordance with the principles of my invention.
Figure 7:
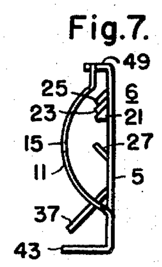
Fig. 7 is an end elevational view of the electrical contact shown in Fig. 6.

Referring to Fig. 2, it will be noted that the side walls 10 and 30 of housings 2 and 4, respectively, are provided with a series of semi-circular openings on their mating line so that when housings 2 and 4 are assembled together a series of varying size circular openings 29, 31 and 33 are provided on each side of the receptacle. Openings 29, 31 and 33 are respectively located so as to be disposed with relation to the spaces between upper jaws 21, 23 and 25 and lower jaw 27, respectively, and are designed to receive, illustratively, #14, #12 and #10 wires, respectively. By this construction, the conductor or wire may be inserted through the appropriate one of openings 29, 31 and 33 so as to be engaged by the respective jaws therebehind. Openings 29, 31 and 33 vary in size so that an opening designed to receive a smaller gauge wire cannot receive a larger gauge wire in order to prevent a larger gauge wire from being inserted and permanently deforming the smaller spaced jaws. Although a smaller diameter wire may be inserted in a larger opening, the jaw spacing heretofore described is too large to grasp the inserted conductor. Thus, only one opening may be used for a given size conductor to establish an electrical connection to terminal 6.

In operation a conductor, not shown, is inserted into the proper size opening and forced inwardly into engagement between the appropriate spaced jaws and is grasped by the jaws so that a firm mechanical and electrical connection is made between the terminal 6 and the inserted conductor. As the spaced jaws are properly spaced and are dished inwardly, they readily permit the inserted conductor to pass inwardly of chamber 3 of the receptacle by slightly forcing the jaws apart. In order to facilitate the insertion of a conductor between the spaced jaws, slots 35 are provided adjacent each end of jaws 27 and therebetween which extend downwardly, but terminate short of the bottom edge of terminal 6 to approximately the same point as the bottoms of slots 13. By this means, lower jaws 27 are more flexible and are substantially independent in operation of each other. Similarly, jaws 21, 23 and 25 may be separated by a slit so as to be independently supported from the upper portion of terminal 6. Such independent support also facilitates the formation of all the described jaws. Thus, when a conductor is inserted between a particular set of jaws, both the upper and lower jaws will resiliently deflect in the direction of the force applied to the conductor until the conductor slips past the displaced jaws. Once a conductor has so slipped past the spaced jaws, any withdrawal force applied to the conductor will cause the opposed edges of the jaws to more firmly grasp the conductor therebetween. Also, as the jaws are all independent, a spring gripping action is obtained, whereby an inserted conductor will not be loosened due to any vibrational forces.

In order to withdraw an inserted conductor, terminals 6 have been provided with an inwardly sloped lug 37 which is centrally located below each jaw 27. Lugs 37 are accessible from without the receptacle by means of openings 39 provided in the base 28 of lower housing 4 immediately below each lug 37. Again, in order to obtain movement of the lower lugs 37, slots 41 are provided at each side of each lug 37. As lugs 37 slope inwardly within chamber 3, an upwardly applied force upon lugs 37 will cause lugs 37 to rock the respective lower jaw 27 toward inner side 9 of side wall 30 whereby a retained conductor is released from the clamping action of the jaws. Such release may rapidly be accomplished by inserting a blunt instrument such as the blade of a screwdriver through an opening 39 and engaging lug 37. Also such release may be accomplished by merely pivoting such a blade around one edge of opening 39. It will be particularly noted that as lower jaws 27 are independent, only the conductor held by one lower jaw 27 will be effected.

Although terminal 6 may be located within chamber 3 in various manners, it is the purpose of my invention to eliminate any time consuming aligning of the terminal 6 within the assembled receptacle. Accordingly, the lower edges of terminals 6 are turned inwardly to form inwardly projecting flanges 43 which seat in opposite corners, respective, of the lower housing 4 at the junction of side walls 30 and base 28 on the upper surface of base 28. The upper edge of terminal 6 above the opening 19 is similarly turned inwardly to form an inwardly projecting flange 49 which seats in the corner of the upper housing 2 at the junction of a side wall 10 and the inner surface of faces 12. As more clearly shown in Figs. 3, 4 and 5, the upper housing 2 is provided with a pair of downwardly projecting inwardly sloped projections 51 which engage the upper flange 49 to force the upper edge of terminal 6 against the side wall 10 of upper housing 2. In a similar manner integral extending projections (not shown) may be provided, if desired, on the inner surface of base 28 to locate flanges 43.

In assembling such an electrical receptacle, the electrical terminals 6 are initially inserted in the bottom half of each chamber 3 within lower housing 4 and the yoke 8 is placed on the top of lower housing 4 so that the central portion 46 is located on top of the post 44, and the extending arms 52 engage the top surfaces 40 of end walls 32 of lower housing 4. Thereafter, the upper housing 2 is placed on the lower housing 4 and, in so doing, the projections 51 on upper housing 2 engage the upper flange 49 of each terminal 6, whereby further downward movement of upper housing 2 causes terminals 6 to be forced against the inner surfaces 7 of side walls 10 so that it is properly located within chamber 3. Thereafter, the entire assembly may be secured together by deforming the yoke in the manner described in the aforementioned copending application.

By this construction, it will be noted that I have provided a simple pair of contacts which may be easily formed as separate parts and which may be properly located within the receptacle without requiring any extra jigs or fixtures. When so assembled, the terminal 6 may easily be electrically connected to an electric conductor by merely inserting a conductor within the appropriate opening provided in the side of the receptacle and forcing it between the contact jaws so that it is grasped by these jaws. This simple push-in type of wiring substantially reduces the installation time required so that no forming of the wire after the removal of its insulation is necessary. Further, it will be noted that as the lower jaws 27 of the terminals 6 are independent, the receptacle may be wired across a normal two-wire system with a pair of conductors connected to each terminal 6 and being independently insertable or removable from the other.

Although I have shown and described one particular form of terminal which incorporates the various features of my invention, in accordance with the patent statutes, I am aware that other modifications may be made without departing from the spirit and scope of my invention. Accordingly, it is desired that the invention be not limited to the particular form of terminal or use thereof specifically illustrated and described herein, but that the invention should be given a broad scope and be limited only as required by the prior art.

I claim as my invention:

1. A wiring device comprising a hollow casing of insulating material having a terminal located in fixed relationship therein, said terminal having a plurality of resilient staggered jaws each of which is spaced a different distance from a movable jaw so that each staggered jaw forms a spaced pair of jaws in conjunction with said movable jaw, each of said pair of jaws being spaced to receive a known size inserted conductor therebetween, means whereby a conductor may be inserted between any one of said pairs of jaws from the exterior of said casing, and an opening in said casing adjacent said movable jaw so that said movable jaw is accessible to be moved and thereby release said inserted conductor from said one pair of jaws.

2. A wiring device comprising a hollow casing of insulating material having a terminal located in fixed relationship therein, said one piece terminal having a resilient first jaw and a resilient second jaw which is independently movable with relation to said first jaw, said first and second jaws being spaced apart a distance to firmly engage an inserted conductor therebetween, an opening in said casing whereby a conductor may be inserted between said jaws from one direction externally of said casing, said jaws being convergent in said one direction whereby movement of said conductor in a reverse direction is opposed by said jaws, and another opening in said casing adjacent said second jaw so that said second jaw is engageable to be moved to release said conductor.

3. A wiring device comprising a casing of insulating material having a terminal located in fixed relationship therein, said terminal having a plurality of resilient staggered jaws each of which is spaced a different distance from an integral movable jaw so that each staggered jaw forms a spaced pair of jaws in conjunction with said movable jaw, each of said pair of jaws being spaced to receive a known size inserted conductor therebetween, a plurality of openings in said casing located so that a conductor may be inserted between any one of said pairs of jaws in one direction, said jaws being convergent in said one direction, so that movement of said conductor in a reverse direction is opposed by said jaws, and another opening adjacent said movable jaw so that said movable jaw is accessible to release said conductor.

4. A wiring device comprising an elongated casing of insulating material having a terminal located at each side thereof in fixed relationship, each of said terminals having a plurality of resilient staggered jaws each of which is spaced a different distance from an integral movable jaw so that each staggered jaw forms a spaced pair of jaws in conjunction with said movable jaw, each of said pair of jaws being spaced to receive a known size inserted conductor therebetween, a plurality of openings in said casing located so that a conductor may be inserted in one direction between any one of said pairs of jaws of each terminal externally of said casing, said jaws of each terminal being convergent in said one direction whereby movement of said conductor in a reverse direction is opposed by said jaws, and a plurality of other openings adjacent each of said movable jaws, respectively, so that each of said movable jaws is accessible to release said conductor.

5. A wiring device comprising a casing having an upper and a lower elongated dished housing of insulating material adapted to be secured together, one of said housings being provided with a longitudinally extending first slot in which an electrically conducting terminal is adapted to be located, the other of said housings being provided with a second slot adapted to cooperate with said first slot to enclose said terminal, camming means integral with the other of said housings for engaging an inner portion of said terminal to locate said terminal in fixed relationship within said casing, and means integral with said contact and said casing whereby said terminal may be electrically energized by inserting an electrical conductor within said casing.

6. A wiring device having an upper and lower elongated dished housing of insulating material adapted to be secured together, one of said housings being provided with a pair of longitudinally extending first slots each of which is adapted to receive an electrically conducting terminal, the other of said housings being provided with a pair of second longitudinally extending slots adapted to cooperate with said first slots to enclose said terminals, means integral with said other housing located within each of said second slots having a tapered edge for engaging and camming an inner portion of each of said terminals to locate said terminals in fixed relation within said casing, and means integral with said contact and said casing whereby said terminal may be electrically energized by inserting electrical conductors within said casing to engage each of said terminals.

7. A wiring device comprising an elongated support of insulating material having elongated terminals at each side in fixed relationship thereto, each of said terminals having a plurality of first resilient jaws spaced from a plurality of second resilient jaws, each of said second resilient jaws comprising a plurality of adjacent jaws each of which is spaced a different distance from one of said first jaws, said spacings being predetermined so that each adjacent jaw in cooperation with its respective first jaw forms a pair of jaws which are adapted to receive a single sized conductor therebetween, and means whereby a conductor may be inserted between each of said cooperating jaws.

8. A wiring device comprising an elongated support of insulating material having elongated terminals at each side in fixed relationship thereto, each of said terminals having a plurality of first resilient jaws spaced from a plurality of second resilient jaws, each of said second resilient jaws comprising a plurality of adjacent jaws each of which is spaced a different distance from one of said first jaws, said spacings being predetermined so that each adjacent jaw in cooperation with its respective first jaw forms a pair of jaws which are adapted to receive a single sized conductor therebetween, openings in said casing through which a conductor may be inserted to engage each of said cooperating jaws, and said openings varying in cross section so that a conductor larger than said single size conductor cannot be inserted between said cooperating jaws.

9. A wiring device comprising an elongated support of insulating material having elongated terminals at each side in fixed relationship thereto, each of said terminals having a plurality of first resilient jaws spaced from a plurality of second resilient jaws, each of said second resilient jaws comprising a plurality of adjacent jaws each of which is spaced a different distance from one of said first jaws, said spacings being predetermined so that each adjacent jaw in cooperation with its respective first jaw forms a pair of jaws which are adapted to receive a single sized conductor therebetween, openings in said casing through which a conductor may be inserted to engage each of said cooperating jaws, and said openings varying in cross section so that a conductor larger than said single size conductor cannot be inserted between said cooperating jaws, lever means integral with each of said first jaws whereby said inserted conductor may be released from each pair of jaws, and means whereby said lever means is accessible externally of said casing.

10. An electrical receptacle comprising an elongated support of insulating material having elongated terminals at each side in fixed relationship thereto, each of said terminals having a plurality of first resilient jaws spaced from a plurality of second resilient jaws, each of said second resilient jaws comprising a plurality of adjacent jaws each of which is spaced a different distance from one of said first jaws, said spacings being predetermined so that each adjacent jaw in cooperation with its respective first jaw forms a pair of jaws which are adapted to receive a single sized conductor therebetween, and means whereby a conductor may be inserted between each of said cooperating jaws, said terminal having a third resilient means located at each of its ends, and a pair of spaced openings at each end of said casing whereby a connector may be inserted to engage the third resilient means of each terminal at one end thereof.

11. A wiring device comprising an elongated casing of insulating material having a terminal located at each side thereof in fixed relationship, each of said terminals having a movable jaw spaced from a second jaw, at least one of said jaws having a plurality of staggered jaws so that each staggered jaw forms a spaced pair of jaws in conjunction with the other jaw, each of said pair of jaws being spaced to receive a known size inserted conductor therebetween, a plurality of openings in said casing located so that a conductor may be inserted in one direction between any one of said pairs of jaws of each terminal externally of said casing, said jaws of each terminal being convergent in said one direction whereby movement of said conductor in a reverse direction is opposed by said jaws, and means whereby said movable jaws is accessible to release said conductor.

References Cited in the file of this patent

UNITED STATES PATENTS

| | | |
|---|---|---|
| 2,206,799 | Barton | July 2, 1940 |
| 2,671,204 | Hubbell | Mar. 2, 1954 |